Figures 1, 2:
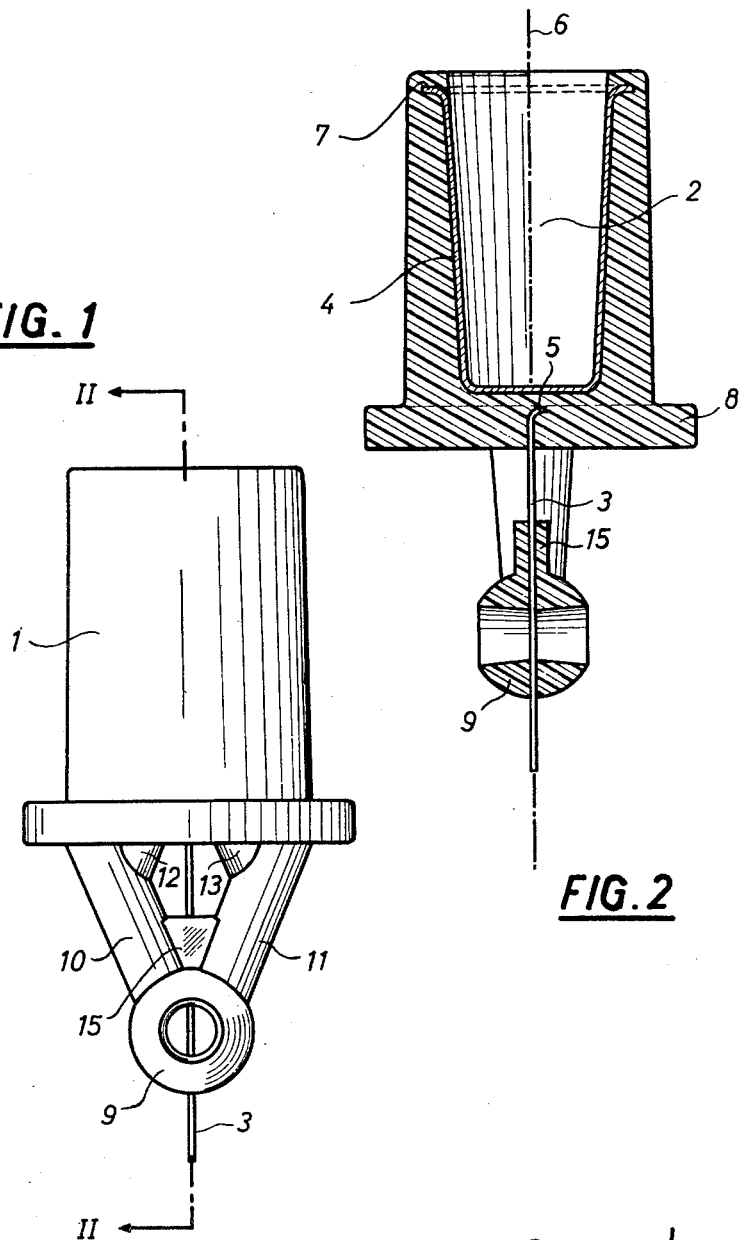

Aug. 28, 1962    A. MIEVILLE    3,051,025
SMALL-SIZED DRILLING TOOL FOR THE DRILLING
OF EXTREMELY HARD MATERIALS
Filed Aug. 5, 1960

Inventor:
André MIÉVILLE
by: J. Delatre-Seguy
Attorney

United States Patent Office 3,051,025
Patented Aug. 28, 1962

3,051,025
SMALL-SIZED DRILLING TOOL FOR THE DRILL-
ING OF EXTREMELY HARD MATERIALS
André Mieville, Lausanne, Switzerland, assignor to
Marie-Louise Spira-Klein, Geneva, Switzerland
Filed Aug. 5, 1960, Ser. No. 47,716
Claims priority, application Switzerland Dec. 8, 1959
1 Claim. (Cl. 77—67)

It is a well-known fact that it is necessary to use for the boring of very narrow bores in extremely hard materials a drill subjected to a high rotary speed and constituted by an elastic steel wire. The steel wire is embedded in a body of synthetic material, through which the tool is fitted in the carrier spindle and, to this end, the body is provided with a recess adapted to be engaged by the spindle.

Now, it has been found that in the case of small lengths of synthetic bodies, say 1.5 cm., the recess provided for its fitting over the spindle does not always result in a sufficient technical accuracy. In the case of extremely small bore diameters, for which the drilling tool is intended, say between 0.05 mm. and 0.10 mm., the seat formed on the synthetic body, when not free from the objection, produces a substantial modification in size.

Furthermore, it has been found that, by reason of the extremely small diameter of the drilling wire, said wire cannot be always embedded in a perfectly satisfactory manner in the synthetic body and, consequently, it may be released during operation or it may be readily snatched out.

Now, my invention has for its object a drilling tool of the type described, constituted by a synthetic body provided with a recess in which is embedded a steel wire, said invention removing in a very simple manner the above drawbacks. This is provided by introducing centrally a metal sleeve in the recess formed in the synthetic body and by bending the end of the embedded section of the wire transversely with reference to the rotary axis of the tool. Thus, the necessary fitting of the drilling tool on the spindle is reliably obtained and, furthermore, no axial or radial movement of the wire in the synthetic body is allowed.

The accompanying drawings show diagrammatically a preferred embodiment of my invention, FIG. 1 being an elevational view of my improved tool and FIG. 2, a sectional view thereof through line II—II of FIG. 1.

As illustrated, 1 designates the body of synthetic material, 2 the recess formed therein for engagement by the spindle which is not illustrated and 3 the drilling wire. The synthetic material used may be, for instance, a polyamide.

According to the invention, there is introduced centrally into the recess of the body 1 adapted to engage the end of the carrier spindle, a metal socket 4, for instance of brass, while the steel wire 3 is bent at its inner end 5 engaging the body 1 in a direction perpendicular to the rotary axis 6 of the tool.

The centering socket 4 is closed at its lower transverse end. Its upper edge 7 flares outwardly after the manner of the outer flange of a bell and it engages through said outer flaring edge the material forming the surrounding body of synthetic material 1. Thus, the socket is permanently and rigidly secured inside the body of synthetic material. The latter is in the shape of a cylinder provided with an outer flange or collar 8 which furthers the handling of the boring tool.

At its outer projecting end, the steel wire is held in position by a ring 9 of synthetic material lying in a diametrical plane of the body 1 and through which the wire extends diametrically, while it is connected with the body 1 through two stays of synthetic material arranged in V formation. The ring, stays and body are formed in one in the molding. The stays are stiffened by the ribs 12, 13 and 15. Ahead of the transverse rib 15 and centrally of the ring 9, the drilling wire 3 is free. This is necessary for a proper molding and is associated with the centering of the drilling wire in the molding between two points.

What I claim is:

A small-sized drilling tool to be fitted on a spindle and serving for the drilling of extremely hard materials, comprising a body of synthetic material provided with an axial recess at one end, a metal socket fitted centrally in said recess in a permanent manner and adapted to be fitted over the tool spindle, and a drilling wire embedded in the body of synthetic material axially of said recess, including an end projecting out of said body in a direction opposed to said recess and a short inner terminal section opposed to the first mentioned end and extending inside said body at right angles with reference to the axial direction of said recess, a ring of synthetic material lying in a diametrical plane of the body beyond the end of the latter facing away from the recess and through and beyond which the projecting part of the drilling wire extends diametrically, and a V-shaped stay system of synthetic material extending to either side of said projecting part of the wire and connecting said ring with the body.

References Cited in the file of this patent
UNITED STATES PATENTS
2,968,200    Latour _____ Jan. 17, 1961